United States Patent [19]

Cupp

[11] 3,740,076
[45] June 19, 1973

[54] ANTI-JACKNIFING TRAILER COUPLING
[76] Inventor: James E. Cupp, 4454 Central Avenue, San Diego, Calif. 92116
[22] Filed: Jan. 7, 1972
[21] Appl. No.: 215,998

Related U.S. Application Data
[63] Continuation-in-part of Ser. No. 43,429, June 4, 1970, abandoned.

[52] U.S. Cl............ 280/432, 280/408, 280/423 B, 280/446 B
[51] Int. Cl............................................. B62d 53/10
[58] Field of Search..................................... 280/432

[56] References Cited
UNITED STATES PATENTS
2,553,959  5/1951  Cook et al. .................. 280/432 X
3,421,777  1/1969  Barker et al. .................. 280/432 X
2,762,634  9/1956  Moseley............................ 280/432
2,146,145  2/1939  Huffman............................ 280/432

Primary Examiner—Leo Friaglia
Attorney—Richard K. MacNeill

[57] ABSTRACT

Means for permitting a trailer to move forward a short distance, toward the tractor under conditions that might otherwise result in a dangerous jacknife. As the distance between the trailer and the tractor to which it is attached is closed, turn restricting members on the two units are brought into contact with each other. Jacknifing is avoided because the abutting members insure that the angle between the coupled units will remain sufficiently large to avoid buckling and a loss of road wheel traction and driver control.

4 Claims, 18 Drawing Figures

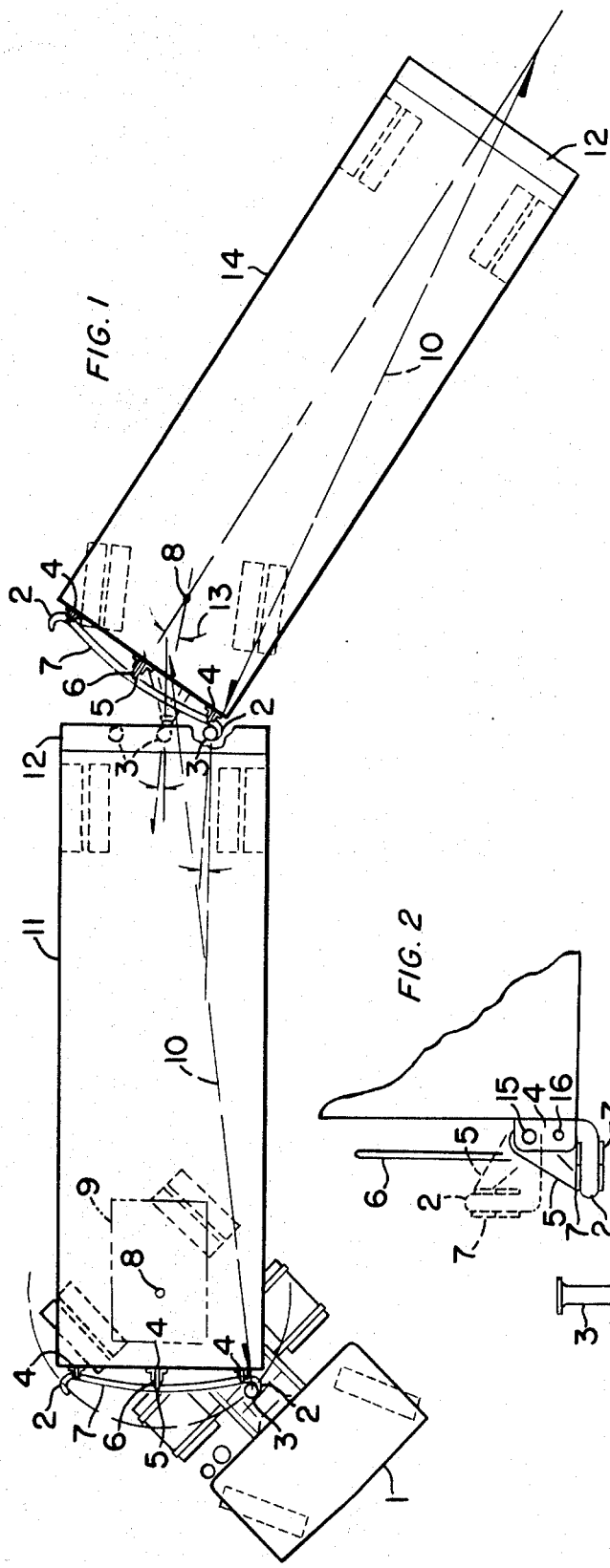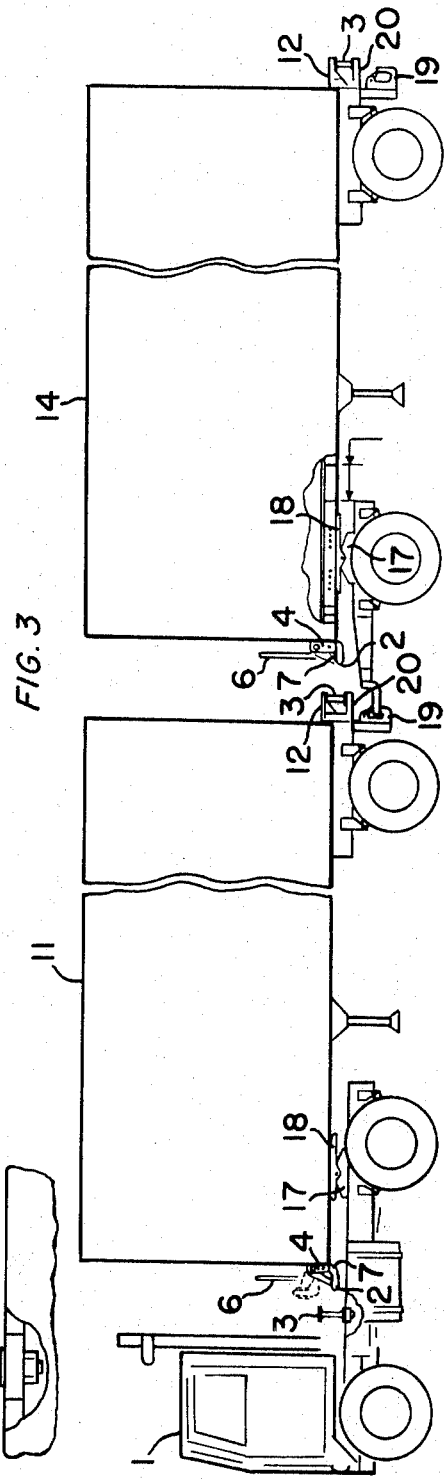

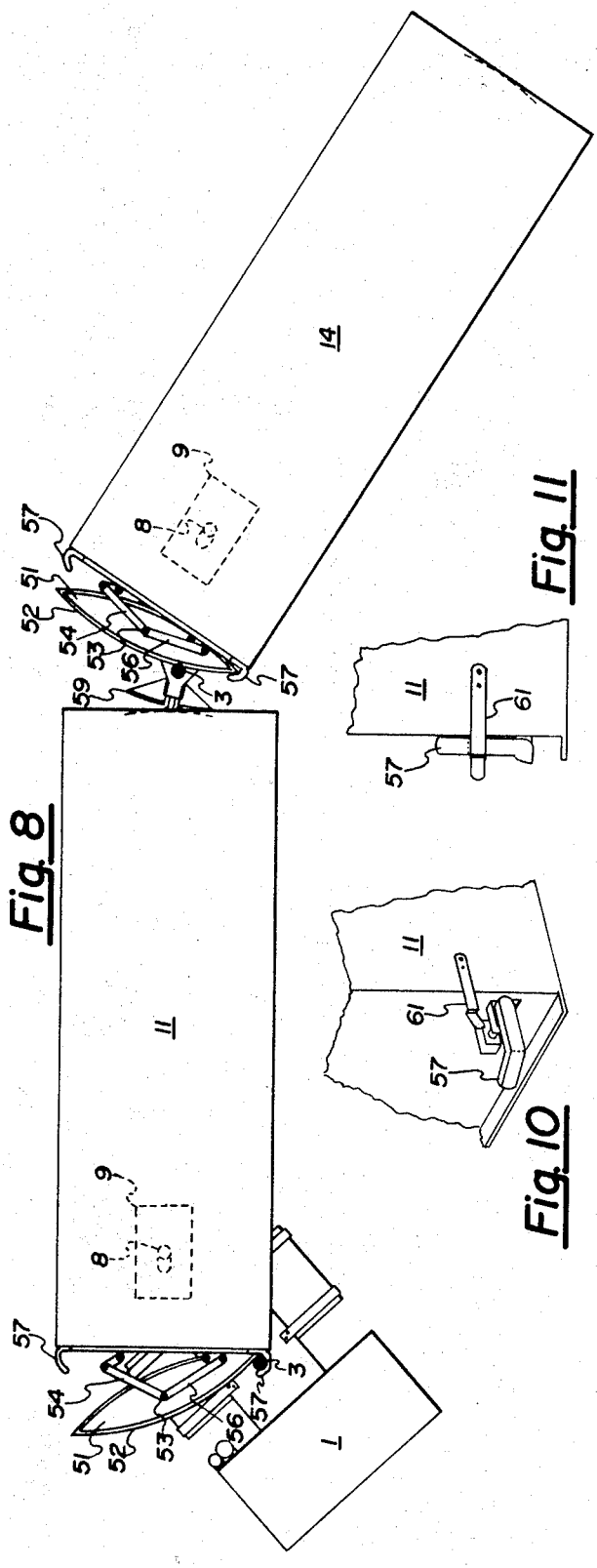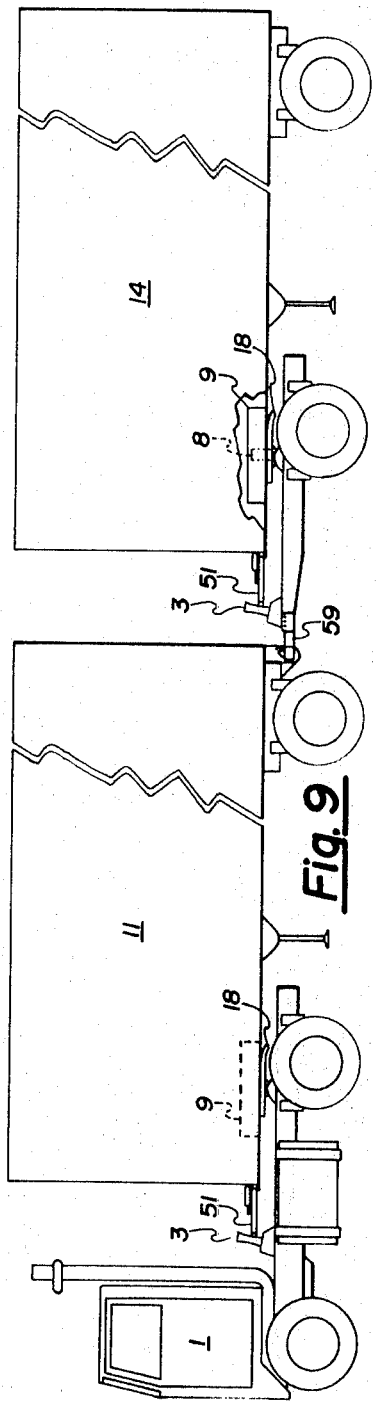

INVENTOR.
JAMES E. CUPP

BY

Richard K. Macneill

ANTI-JACKNIFING TRAILER COUPLING

RELATED APPLICATIONS

This application is a continuation-in-part of my co-pending application for ANTI-JACKNIFING TRAILER COUPLING, filed June 4, 1970, Ser. No. 43,429 and now abandoned.

BRIEF DESCRIPTION OF THE INVENTION

Jackknifing or buckling occurs when a semi or full trailer pushes its towing vehicle in such a manner that a very acute angle results between the units. It is not uncommon for jackknifing to result in serious highway accidents with resultant loss of life, limb and property.

Heretofore there has been no practical device for permitting tight angling between the hitched vehicle units under usual driving conditions, and yet, when the rear unit is pushing, preventing the acute angling between the units so that buckling will not result.

This invention comprises a novel automatic latch system associated with the conventional king pin. The king pin engages with the fifth wheel as is customary. However, the otherwise dangerous forward force in the direction of travel will unlatch a mechanism so that the semi-trailer will move forward about 15 inches in respect to the king pin. Since the trailer is now 15 inches closer to the tractor, contact is made between a roller on the towing vehicle and a mating portion preferably being a curved rail mounted on the semi-trailer whereby arms on the end of the rail may engage the roller to prevent a sharp angle between the units, and therefore making dangerous jackknifing impossible. In fact, the parts are so arranged that forced contact between the roller and rail tend to cause a desired alignment between tractor and trailer.

A second embodiment contemplates a pair of rails mounted, for example, on a semi-trailer and a trailer which cooperate in much the same manner but require less than an inch of relative movement to effect contact when the trailer is pushing, e.g., in a down hill grade.

Although tractor and semi-trailer units are described throughout, it is to be understood that my invention is equally applicable to double trailers. The interacting parts are substantially the same in either case. The problem of jackknifing has occurred with both type units and this device may be applied to either or both type units with equal success.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a top plan view of a double trailer rig provided with the embodiment of this invention;

FIG. 2 is a detail showing the roller and rail arrangement;

FIG. 3 is a side elevation of the rig shown in FIG. 1;

FIG. 8 is a top plan view illustrating a modification of the embodiment illustrated in FIG. 1;

FIG. 9 is a side elevation of the embodiment of FIG. 8;

FIG. 10 illustrates a latching mechanism for the dead stop portion of FIGS. 8 and 9 in the unlatched position;

FIG. 11 illustrates the latch mechanism of FIG. 10 in the latched position;

DETAILED DESCRIPTION OF THE DRAWINGS

Figure 4:
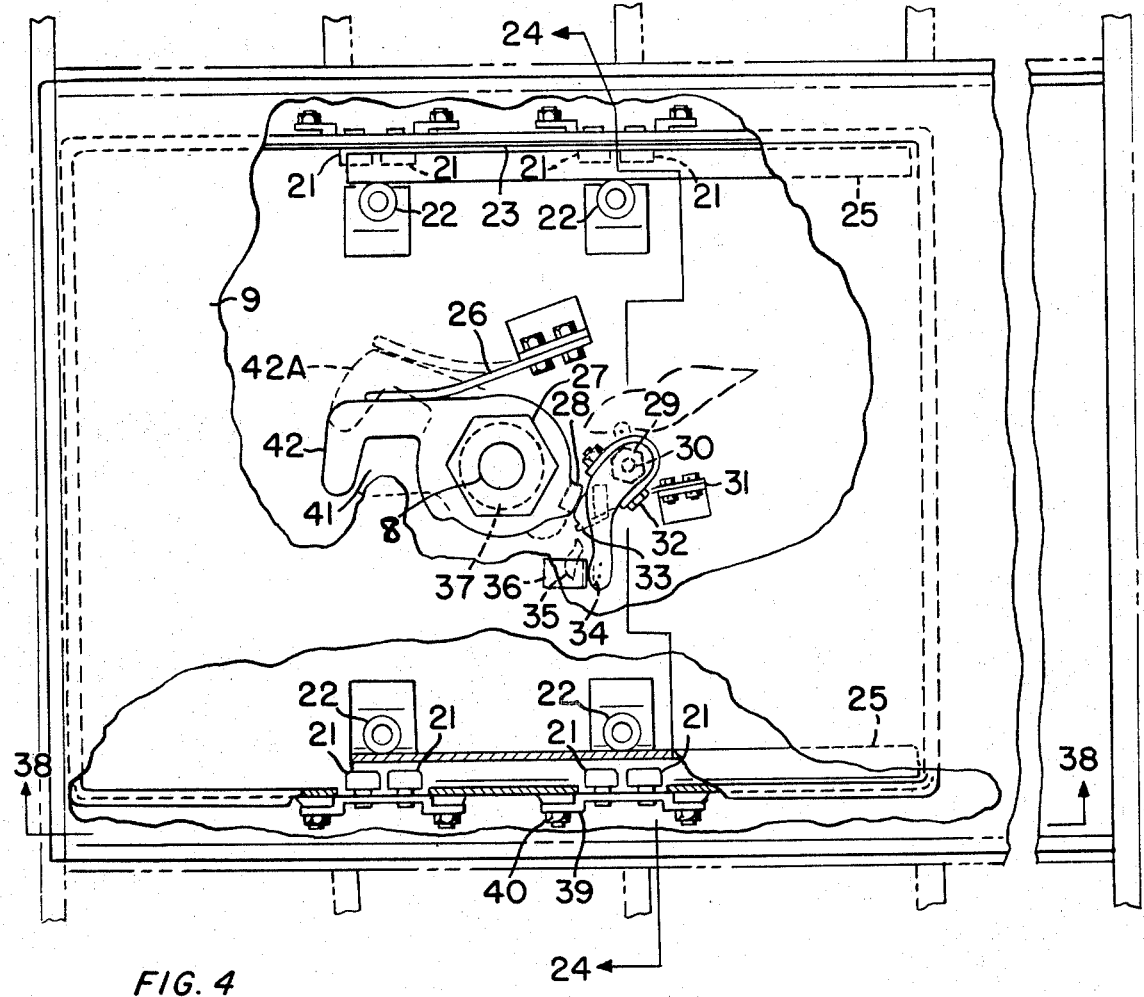
FIG. 4 is a top plan detail showing the automatic latching and release mechanism and rolling portions associated therewith.

In the drawings forming a part hereof where like numerals represent like parts throughout the drawings, FIG. 1 is a convential tractor, except as it has been modified by having a sturdy support member, preferably formed as a vertical steel thrust roller 3 securely and rotatably mounted at a convenient place on the chassis frame between the cab and fifth wheel. Such roller may be mounted on the rear of a semi-trailer 11 or trailer 14 for use as double trailers. In this latter case three equally spaced rollers across the end of the trailer are preferred. Mounting brackets 20 support the multiple rollers and the same are covered by an appropriate extension of the trailer platform 12.

For completeness, the drawings illustrate a duplication of the novel items. One assembly is shown at the tractor semi-trailer coupling; a second assembly is shown at the rear of the semi-trailer; the converter and at the front of the rearmost trailer. As can best be seen in FIG. 3, each trailer may carry the first portion of the novel elements above the pintle hitch 19. The second and matching counterpart portion is at the front of each trailer so that the device is useable regardless of what pulls the trailer. Whether the trailer is hitched to a tractor or converter usual mounting bracket 17 and conventional fifth wheel 18, connect to the third novel portion, it being a restricted movable connector between the king pin and trailer.

Made to operate with the support 3, under otherwise dangerous conditions, is a novel mating portion. It is secured to the road vehicle which is towed by that having support member aligned therewith. The mating portion preferably consists of a thrust rail 7 having a slight convex configuration. It is mounted by two end brackets 4 and a center bracket 5 onto the lower front section of the semi-trailer. Handle 6 is operatively mounted to the rail for swinging the rail upward, out of position when the rig is maneuvered in tight positions, at slow speeds and sharp angles such as in parking. As in FIG. 2, the upward swing occurs as rail bracket 5 pivots on pin or bolt 15. Locking pin 16 may be used to hold the unit in position for use. An important feature of the mating portion are dual arms 2, one at each end of the rail, each curved inwardly for hooking the support member when the rear trailer has pushed forward and the angle between the road units is acute.

Figure 7:
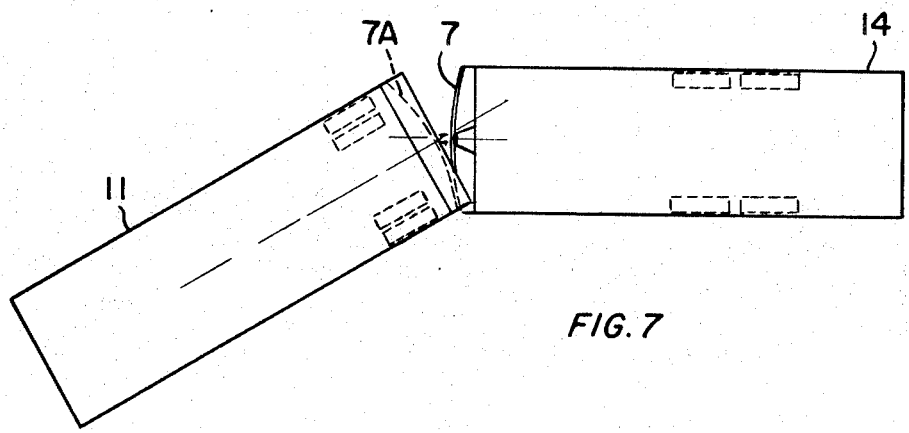
FIG. 7 is a top plan view showing a double trailer using a modification of the embodiment of this invention.

A modification of the described assembly may consist of dual rails as shown in FIG. 7. In this form, a matching convex thrust rail 7A abuts the described rail 7 in place and instead of item 3. The desired result is the same in that the resolution of forces is such that forces manifested at the corner, rather than at a more central point, will tend to again align the tractor and trailer and eliminate the danger of jackknifing.

Figure 5:
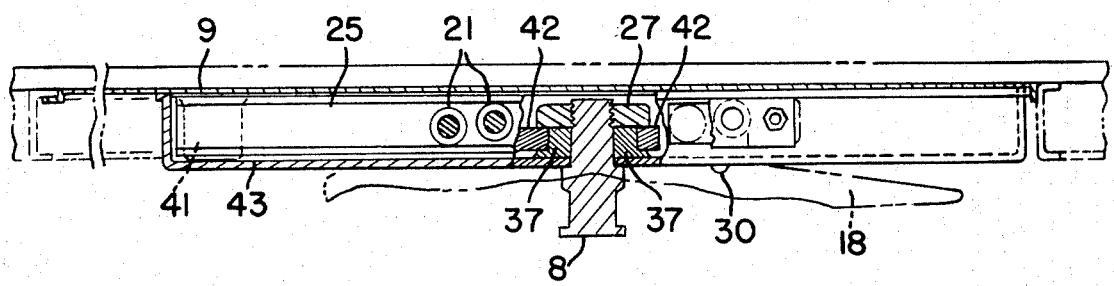
FIG. 5 is a cross sectional side elevation taken along line 38 of FIG. 4.

Turning now to the important mechanism for permitting the limited shift of trailer on king pin, attention is directed to FIG. 4. The usual king pin 8 is downwardly disposed from plate 43 for operation in the customary fifth wheel 18. The pin is held securely in a collar 37 with threaded nut 27. Spring latch 42 is rotatably mounted on the collar. The open end thereof is hook-shaped and is aligned in a forward direction. Under most driving conditions latch 42 is hooked around lug 41. As shown in FIG. 5, lug 41 is welded to steel plate 9 which is integral with the floor of the trailer. Tension spring 26 is mounted on the plate and bears on the latch to hold the latch on the lug. This helps insure that pin 8 and the trailer remain in relatively fixed positions under normal road travel.

If, however, the trailer tends to move angularly towards the tractor, as in braking or coasting, certain unique components function to unhook the latch from lug 41 by swinging the latch into the position indicated by dotted lines 42A.

Figure 6:
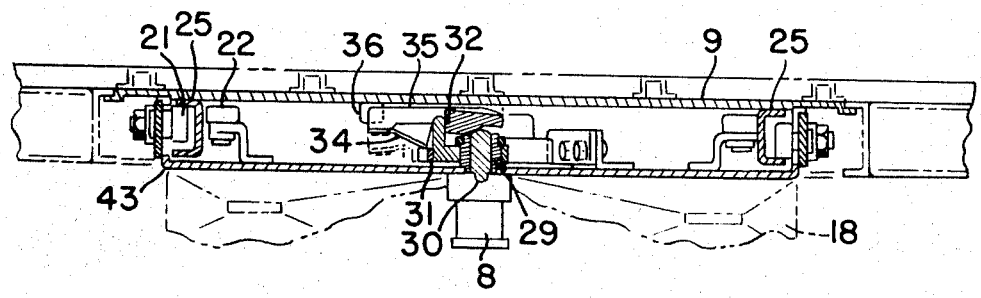
FIG. 6 is a cross sectional side elevation along line 24 of FIG. 4.

If, for example, the angle within arrows 13 of FIG. 1 is 22° or more there may be buckling or jackknifing. At such angling a plunger 30 is forced out of a recess in the fifth wheel through stationary pan 43. The absence of a recess beyond this angle forces the plunger up in a camming type action, the plunger 30, upon sufficient angulation between tractor and trailer, contacts the side wall of the fifth wheel slot which forces the rounded end of the plunger up. The plunger slides in a hollow shaft 29 of FIG. 6. Upon rising, the top of the plunger contacts finger shaped trip lever 35 and raises one end thereof. It is pivotally mounted on shaft 32. The pointed end of lever 35 dips downward as the opposite end is raised by the plunger in a teeter-totter action. When in this lowered position, represented by the dotted lines of FIGS. 6 and 4, the end moves freely under a trip bracket 36 it being a stud welded to plate 9. Flat tension spring 34 holds item 35 against bracket 36 under normal road conditions when there's no danger of jackknifing.

Once, however, lever 35 dips and clears bracket 36 the novel pawl 33 moves. This pawl is integral with and moves in unison with lever 35. The partial clockwise rotation, as shown in FIG. 4, results in a boss 28 on latch 42 being abutted by the pawl. Such engagement holds the latch in an open position. Pawl flat spring 31 helps hold the pawl in such contact. The inner sides of item 41 and the abutting outer sides of the latch hook are tapered slightly so that the forward force of the pushing trailer causes a resolution of forces of latch on lug whereby their sides slip and partially rotate the latch. Only then does the boss face 28 turn far enough to be locked open by surface of pawl 33.

Because of the unhooking from post 41 on tight angulation between tractor and trailer, the otherwise dangerous forward pushing force of the trailer now permits a rolling unit to move forward about 15 inches, in respect to pin 8 which is held by the tractor's (or converter's) fifth wheel. In this action, the latch and described accessories remain with the king pin, but the lug 41 moves forward with the rest of the trailer. This is accomplished by sets of horizontal rollers 21 held to stationary pan 43 by bolts 40 holding brackets 39 on right angled sides of the pan. As can best be seen in FIG. 6, two parallel horizontal channels 25 are secured to plate 9. When the latch is released by the forward thrust of the trailer, plate 9 and the rest of the trailer move forward by the force of this thrust. The channels, moving with the trailer are aligned in the direction of vehicle travel. The channels form tracks for the rollers and can operate within higher or lower tracks depending on trailer tilt. Suitable guide rollers 22 are secured to the fixed pan 43 and contact the back side of the channels. A weather seal 23 may be placed completely around the pan to preserve the described parts from dirt and rust.

Upon forward movement in respect to the semi-trailer 11 the described units on the front of trailer 14 strike support 3 at the rear of the semi-trailer at such an angle that vector 10, representing the resolution of forces, tends to cause the units to align in the direction of travel, and thus avoid jacknifing. The same is true, of course, if the novel units are placed between tractor and semi-trailer.

In use, the hitched units may tend to push or pull each other depending on their changing relative speeds. Under such conditions, tight angling between the units will insure that the latch is unhooked and the device will work. If, however, the units are again substantially aligned plunger 30 will fit into its recess, the hook of latch 42 will again engage item 41 and the more conventional hitch will be maintained.

Referring to FIGS. 8 and 9, a modification of the anti-jackknifing coupling is shown both between tractor 1 and semi-trailer 11 and between semi-trailer 11 and trailer 14. An arc plate 51 having a rail edge 52 is shown carried by semi-trailer 11 and trailer 14. Each of the arc plates 51 are pivotally attached at 53 to hanger arms 54 and 56 which are, in turn, pivotally attached to hanger brackets which will be described with reference to FIGS. 12, 13 and 14. Thrust rollers 3 come in contact with rails 52 of arc plates 51 and, as shown with reference to tractor 1 and semi-trailer 11, can be captured by one of end deadstops 57 carried by semi-trailer 11 and trailer 14. This, of course, limits the angular displacement between tractor 1 and semi-trailer 11 and between semi-trailer 11 and trailer 14. A bow 59 is shown attached below converter eye 60 between semi-trailer 11 and trailer 14. Thrust roller 3 is attached to the converter above the bow 59.

Referring to FIGS. 10 and 11, a spring latch 61 is shown for latching end deadstop 57 when it is necessary to remove the anti-jackknife limitation and allow greater angles between the truck and trailer components.

Figure 12:
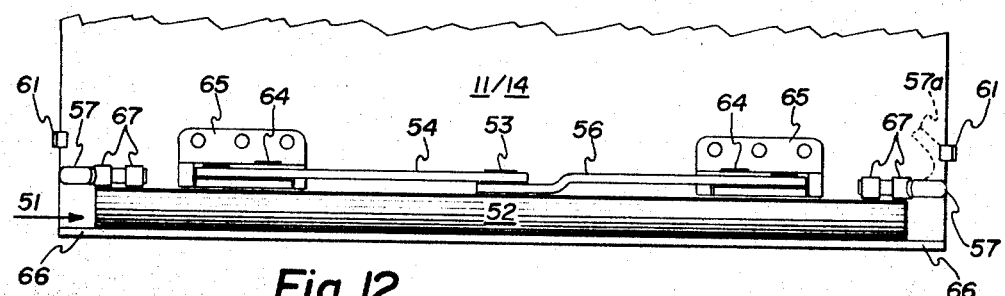
FIG. 12 is a front elevation of a portion of the coupling of FIGS. 8 and 9.
Figure 14:
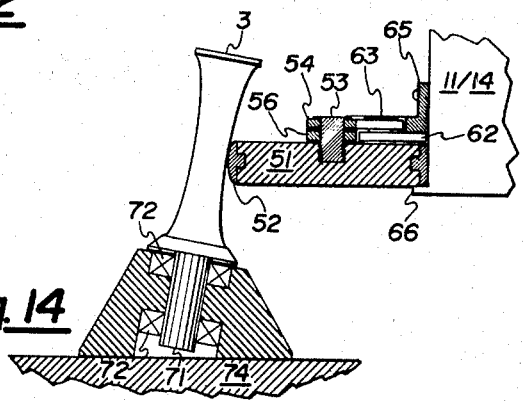
FIG. 14 is a partially sectioned side view of the coupling of FIGS. 12 and 13.
Figure 13:
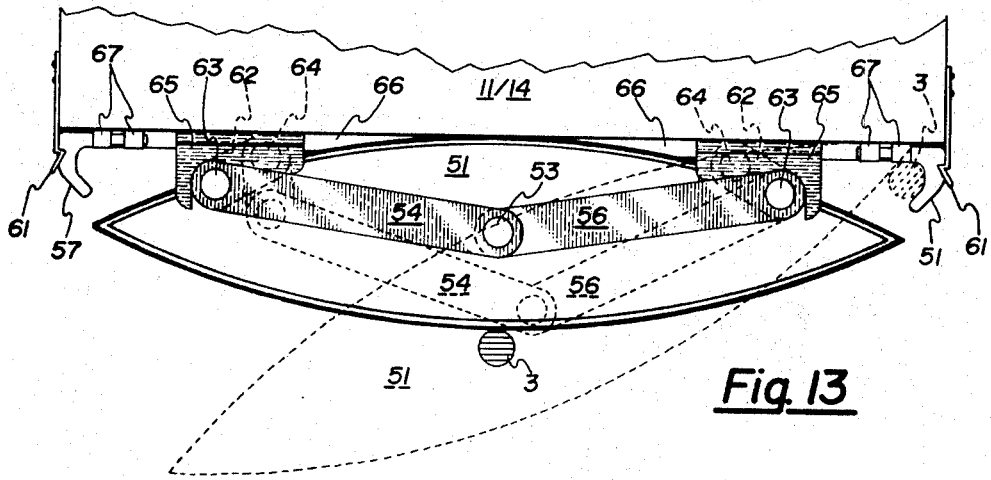
FIG. 13 is a top plan view of the coupling mechanism of FIG. 12.

Referring to FIGS. 12, 13 and 14, the details of the modification of FIGS. 8 and 9 are illustrated. Arc plate 51 is pivotally attached at common hanger pivot 53 to hanger arms 54 and 56. Hanger arms 54 and 56 are pivotally attached to short hanger arms 62 at floating pivots 63. Short hanger arms 62 are pivotally attached at captive pivot 64 to hanger brackets 65. Hanger brackets 65 are fixedly attached above support ledge 66. End deadstops 57 are shown in the rotated down position and held by end deadstop brackets 67. Spring latch latch 61 is shown carried by the side of the semi or trailer body. The up-latch position of end deadstop 57 is shown in FIG. 12 by dotted lines 57A being held by spring latch 61. Supporting ledge 68 is disposed beneath and slidably carries arc plate 51.

Referring to FIG. 14, thrust roller 3 is carried by shaft 71 held within bearings 72 in base and bearing housing 73 which is mounted on tractor or converter base 74. Rail 52 on arc plate 51 is in contact with thrust roller 3.

Figure 15:
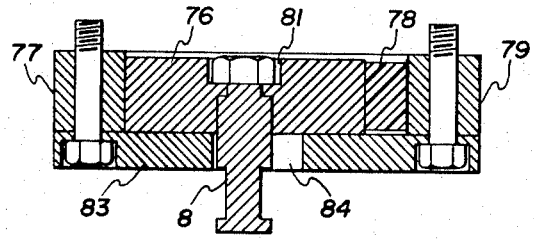
FIG. 15 is a longtitudinal cross section of the king pinslide box mechanism of the embodiment of FIGS. 8 and 9.
Figure 16:
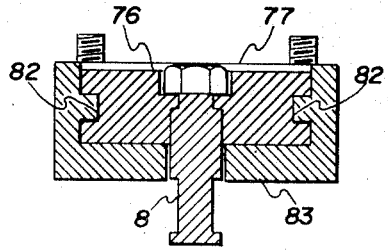
FIG. 16 is a cross section of the king pin-slide box mechanism of the embodiment of FIGS. 8 and 9.

Referring to FIGS. 15 and 16, the king pin and slide box assembly is illustrated in sectional views. King pin 8 is shown captured in slide 76, of slide box 9. Slide 76 is held between front end block 77 and nubber 78 which in turn is held between slide 76 and rear end block 79. King pin 18 is recessed in recess 81 of slide 76. A fixed horizontal relationship in one plane is maintained by the tongue and groove sections 82 of slide 76 and slide box 83, leaving king pin 8 free to slide within aperture 84 in slide box base 83. This motion is limited and cushioned by displacement of nubber 78.

Referring back to FIGS. 11 through 16, it can be seen that in a condition where trailer 14 is pushing semi-trailer 11 and semi-trailer 11 is pushing tractor 1 and/or semi-trailer 11 is pushing tractor 1, king pin 8 and slide 76 will slide toward the rear end block 79 displacing nubber 78 and allowing contact between rails 52 and thrust rollers 3. In this condition with end deadstops 57 in the downward position arc plate 51 will float around common hanger pivot 53 and long hanger arms 54 and 56 together with short hanger arms 62 and will move through floating pivots 63 and captive pivots 64 to the position shown in dotted lines in FIG. 13 allowing thrust rollers 3 to be captured by end deadstops 57 which limit the relative angles between trailer 14 and semi-trailer 11 and between semi-trailer 11 and tractor 1.

Figure 17:
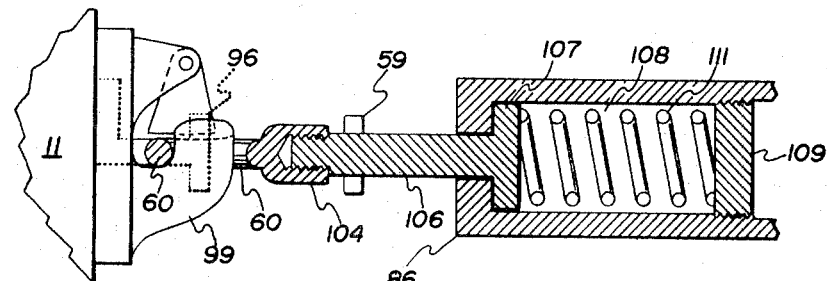
FIG. 17 is a partially sectioned view of the converter eye mounting embodiment of FIGS. 8 and 9.
Figure 18:
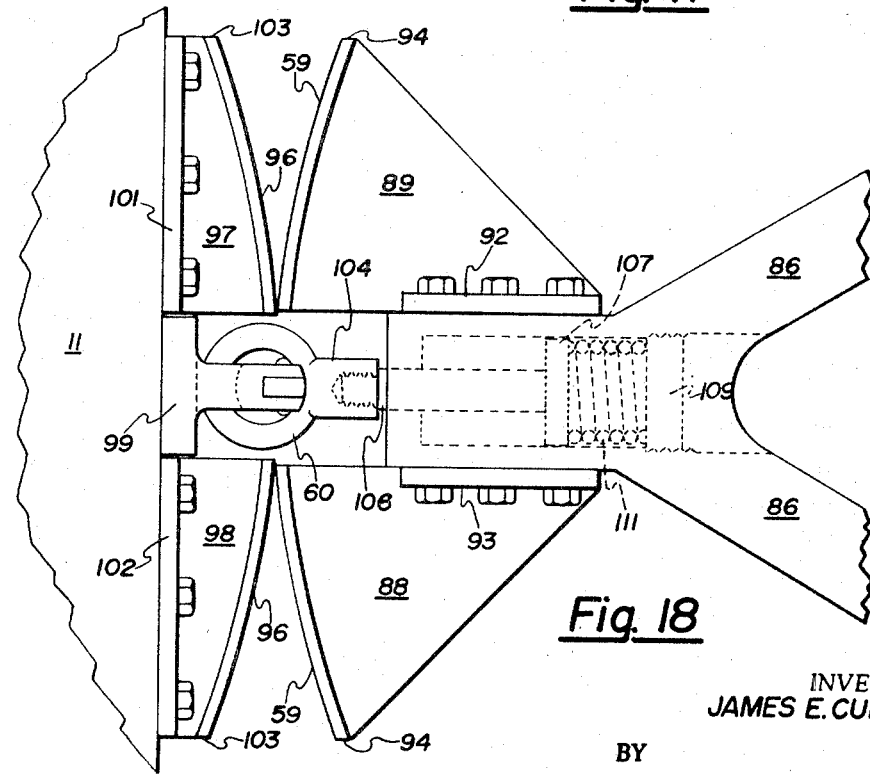
FIG. 18 is a top plan view of the converter coupled bow plate embodiment of FIGS. 8 and 9.

Referring to FIGS. 17 and 18, a rail to rail modification of the embodiment of former FIG. 7 is shown. At the forward end of converter assembly 86 the converter bow surface 59 is established by two separate bow segments 88 and 89 and is therefore discontinuous in the vicinity of eye 60. Convertable segments 88 and 89 are attached to the converter by L-shaped risers 92 and 93. The convertable surface terminates at bow ends 94. In similar fashion, an opposite bowed surface, the semi-bowed surface 96 is established by semi-bow segments 97 and 98 which create a gap in said surface in the vicinity of pintle hook 99 attached to the rear of semi-trailer 11. Semi-bow segments 97 and 98 are attached to the rear of the semi-unit by means of upper turning L-segments 101 and 102. The semi-bow surface also terminates at bow ends 103.

Internally threaded collar 104 which engages the external threaded end of plunger rod 106 is contiguous with eye 60. Plunger rod 106 is contiguous with plunger 107 which has a large diameter and is free to move in one horizontal line within spring chamber 108 which terminates with a threaded spring keeper 109.

As shown in FIG. 18, the converter and the trailer load (not shown) attached to it via the king pin assembly (not shown) are pushing from right to left against the semi-assembly, the eye 60 has been moved to the left compared to its pulling position (FIG. 17) by said pressure transmitted through spring 111 in spring chamber 108 and converter bow surface 87 has been pressed into contact with the semi-bow surface 96. In this manner all of the pressure had been removed from the eye and pintle hook assembly collar 91 and 99, respectively, and transferred to the bow segments 88, 89, 101 and 102. Should this pressure situation occur when the converter is at an angle to the rear surface of the semi the bow surfaces 87 and 96 will remain in contact and the angle of relationship may continue to increase until bow ends 94 and 103 are in contact. In this latter situation plunger 107 will contact the front end of spring chamber 108, eye 60 will be pulled to the right to contact pintle hook 99 and this plunger relationship will act as a deadstop against the increase of the angle between the converter and the semi-bow surface.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. In combination:

first and second road vehicles, said second road vehicle being a trailer hitched to said first road vehicle;

a support member mounted on the rear of said first vehicle;

an arcuate plate secured to the front of the second road vehicle;

a king pin for hitching the second vehicle to a usual fifth wheel of a tractor or convertor;

a movable connector between the king pin and the second road vehicle, which connector permits the support member and the arcuate plate to abut under conditions when said second vehicle is pushing against said first vehicle; and limit means coupled to the front portion of said second road vehicle in proximity with the outside extremes of said arcuate plate and cooperative with said support member for limiting the relative movement of said support member in abutment with said arcuate plate and thereby limiting the relative angle between said first and second vehicles.

2. The claim according to claim 1 above wherein:

support member is a vertically disposed roller.

3. The claim according to claim 2 above wherein:

said limiting means comprises first and second dead stops dimensioned for receiving said roller on each side of said second vehicle.

4. The claim according to claim 1 wherein:

the support member is a rail of convex configuration.

* * * * *